UNITED STATES PATENT OFFICE.

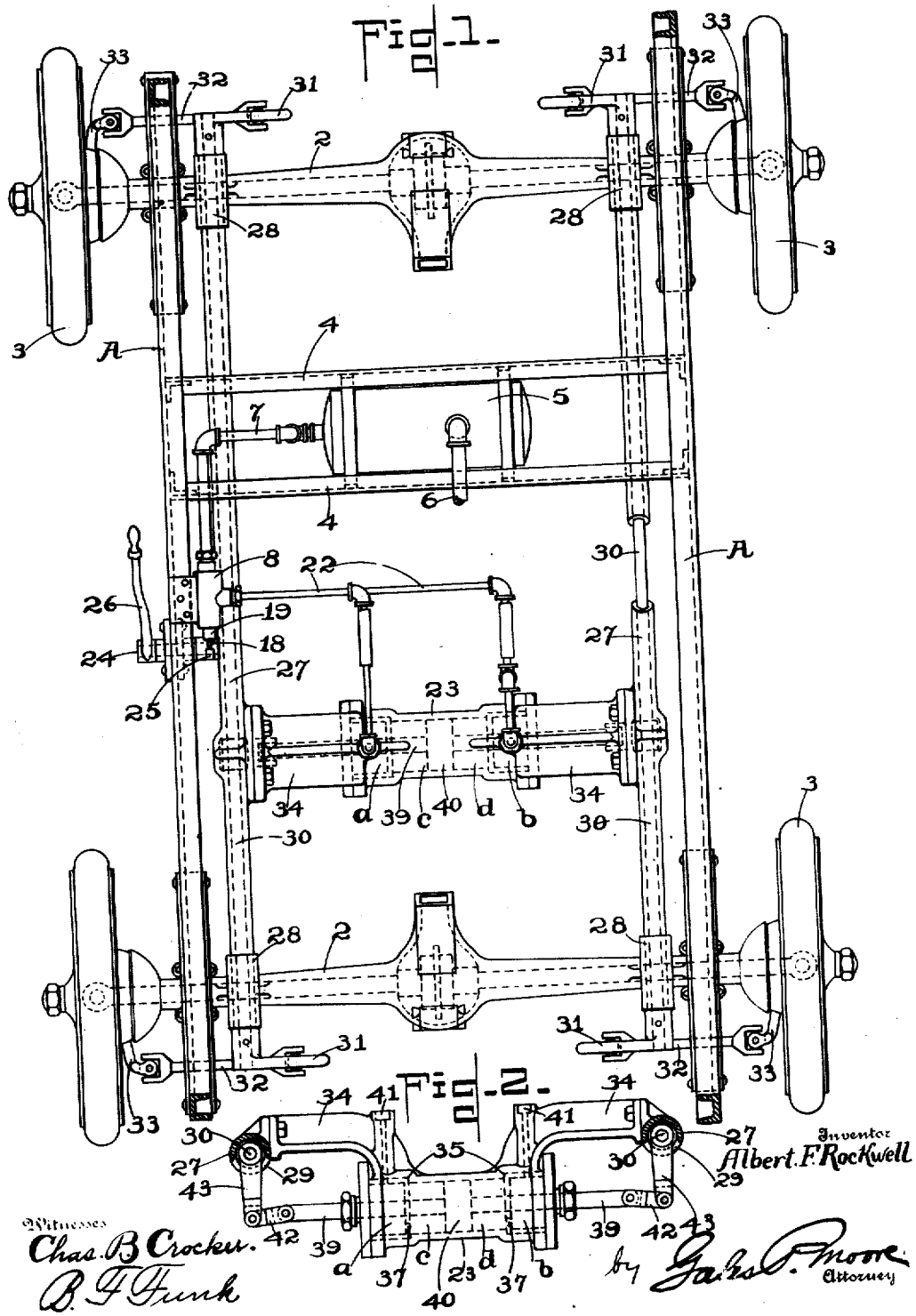

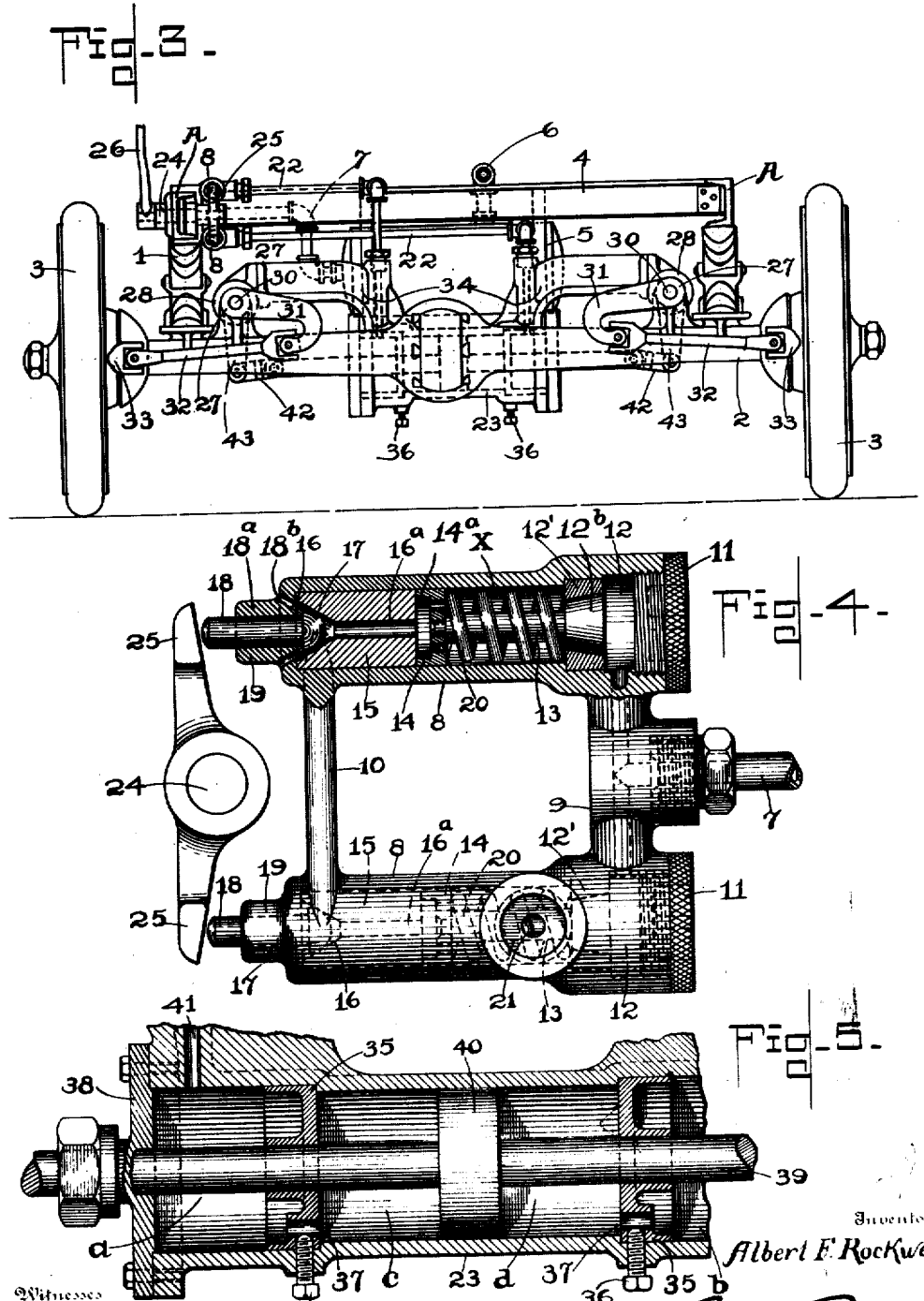

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

STEERING MECHANISM FOR VEHICLES.

No. 922,044.

Specification of Letters Patent.

Patented May 18, 1909.

Application filed November 3, 1905. Serial No. 285,730.

*To all whom it may concern:*

Be it known that I, ALBERT F. ROCKWELL, a citizen of the United States, residing at Bristol, county of Hartford, State of Connecticut, have invented a certain new and useful Steering Mechanism for Vehicles, of which the following is a full, clear, and exact description, such as will enable others skilled in the art to which it appertains to make and use the same, reference being had to the accompanying drawings, forming part of this specification.

This invention relates to a steering mechanism for vehicles, and in order to illustrate the application thereof, I have shown it as being applied to a motor vehicle.

One of the objects of the invention is to provide a fluid actuated means for controlling the direction of movement of a vehicle to which the invention is applied.

Another object of the invention is to provide a fluid actuated steering means which may be efficiently controlled by the operator, so as to cause the steering wheels to become responsive to the will of the operator through said fluid actuated means.

Another object of the invention is to provide means whereby all four wheels of a vehicle may be simultaneously turned, whereby the vehicle may be enabled to scribe an arc in a comparatively short space and in such a manner that any liability of any of the wheels skidding in making the turn will be avoided.

A further object of the invention is to provide means for holding the wheels in any position in which they have been set, either when the vehicle is moving in a straight course or when the wheels are moving in an arc.

It is also the object of my invention to provide means whereby the liability of the steering mechanism to become unmanageable by getting out of order will be avoided, and it is also the purpose of my invention to provide means for quickly exhausting the motive fluid when occasion demands.

Other objects and advantages as well as the novel details of construction will be specifically set forth hereinafter, it being understood that changes of form, proportion and minor details of construction may be resorted to without departing from the spirit of this invention or sacrificing any of the advantages thereof.

In the drawings: Figure 1 is a top plan view of a motor vehicle to which my invention is applied. Fig. 2 is an end view of a portion of a vehicle including the brackets and the steering cylinder as well as the connections for the rockable elements which actuate the wheels. Fig. 3 is an end view of the vehicle and the steering appurtenances. Fig. 4 is an enlarged detail view partly in elevation and partly in section of the steering controller; and Fig. 5 is a fragmentary sectional view through the steering device which is in communication with the controller.

The form of vehicle framing to which I have illustrated my invention as being applied includes a body frame A supported upon springs 1—1 mounted on front and rear axle trees 2—2 carrying axles which support the wheels 3—3.

4—4 designate cross bars which comprise part of the frame A and which in the present instance are designed to support a tank 5 having communication with a suitable source of motive fluid supply (preferably air or gas) not shown. Leading from the reservoir or tank 5 is a pipe or tubular connection 7 through which communication may be had between the tank 5 and the controller.

The preferred form of controller is illustrated in detail in Fig. 4 as comprising a plurality of cylinders 8—8 in communication with the tube 7 through the medium of a T coupling 9, said cylinders also being connected by a rigid connection 10. By referring to Fig. 4 it will be observed that the T coupling 9 is in communication with one end of each cylinder, and the communicating end is closed by a movable screw-plug 11. Spaced a suitable distance from the cap 11 and within each cylinder 8 is a ring 12' having a conical valve seat for the reception of a conical valve 12$^b$. By spacing the ring and valve away from the plug 11, so that in each case the ring and plug are on opposite sides of the inlet port of each cylinder, I provide a chamber 12 for the introduction of the fluid and inasmuch as there is free communication between the supply reservoir and the cylinders 8—8, the valves 12$^b$ are assisted in normally remaining seated so as to prevent the fluid from passing beyond the ring as will be presently explained.

Each valve 12$^b$ is illustrated as having a stem 13 which projects away from the cap 11 and into the elongated portion of the cylinder beyond the ring 12' and into a chamber X. On the end of the stem 13 distant from the valve 12$^b$ is a head comprising a perforated disk 14 having an outstanding peripheral flange which bears against a freely movable plug or piston 15 having a centrally arranged longitudinal port 16$^a$, which communicates with a chamber 14$^a$ formed by the flange of the head 14 which abuts against said piston 15. The outer end of the piston is flared, that is, it is provided with a flared recess 16 in communication with the port 16$^a$. In the flared recess of the piston 16 is a semi-spherical valve 17 having a stem 18 which projects through the end 18$^a$ of each cylinder, which end 18$^a$ is normally closed except for the exhaust ports 18$^b$ therein which are provided for the purpose of permitting a free exhaust of the motive fluid under certain conditions to be hereinafter made apparent.

Each stem 18 is guided through the constricted end 19 of its particular cylinder. 20 designates springs of which there is one in each cylinder, and each spring has one end bearing against the ring 12', and the other end against the head of the stem 13, so as to normally keep the valve 12$^b$ seated and prevent the motive fluid from the reservoir passing from the chamber 12 up through the cylinder. A port 21 is provided in each cylinder beyond the valve seat, and communicating with said ports are tubular connections or pipes 22 through which fluid may be introduced into the steering cylinder 23. The manner of introducing the fluid into the cylinder 23 through the tubular connections 22 is under the control of the operator, who may manipulate the handle 26 on the shaft 24 carrying the rocking arms 25—25 to engage the stems 18—18 of the controller, so as to release the valves 12$^b$ from their seats and permit a free passage of the fluid from one of the chambers 12 into the chambers X and thence through the tubular connections 22.

The devices for steering the wheels are illustrated as consisting of rockable elements 30, contained within the tubular supports 27 which are connected to the respective axle-trees by the supporting brackets 28. By connecting the tubular supports 27 to the brackets which are supported by the axle-trees 2—2, and forming them of tubular construction, they are permitted to serve a dual purpose, that is, they not only act as supports for the rockable elements, but they also serve the purpose of reaches for connecting the two axle-trees together. On the ends of the respective rockable elements are rock arms 31, which are connected to the arms 33 of the respective wheels by the links 32, it being understood that the wheels are permitted to have a horizontal pivotal movement. In order to actuate the rockable elements I have illustrated means comprising the cylinder 23 which is supported on brackets 34 carried by the supports 27, said cylinder 23 being arranged intermediate the ends of the vehicle and transversely of the frame thereof. The cylinder 23 is what might properly be termed a compartmental cylinder, in that it is provided with a central compartment $c$, $d$, and end compartments $a$ and $b$. The compartments or divisions are made in the cylinder by the partitions 35—35, each partition having a communicating port 37 whereby communication may be had between the respective compartments $a$ and $b$ with the compartment $c$, $d$. The partitions 35 which are provided with flanges are held in place by the screws 36 which pass through the walls of the cylinder 23 and through the flanges of the respective partitions, said screws being adapted to enter the ports 37, so that the screws may be manipulated to increase or decrease the size of the passages through which communication may be had between the respective compartments of the cylinder. The reference numeral 39 designates a piston-rod which passes through the respective ends 38 of the cylinder 23 and through the partitions 35 in said cylinder. The piston-rod carries, intermediate its ends, a piston 40 which is slidable in the central compartment of the cylinder. The ends of the piston rod 39 are connected to depending crank-arms 43 through the medium of links 42, said crank-arms being in turn supported on the rockable elements 30 and extending through appropriate slots 29 in the said casing 27. As has been heretofore explained the tubular connections 22 are in communication with the cylinder 23 and such communication is preferably had through the medium of the inlet ports 41—41 leading into the compartments $a$ and $b$ respectively. In actual practice I prefer to utilize air or gas in combination with a suitable liquid, the latter being preferably an oil. The liquid will be of sufficient quantity to practically fill the entire central compartment, so that when the piston 40 should happen to be at the extreme end of its stroke, to turn the wheels in one direction, the said central compartment would be practically filled with the oil or other liquid; also in this event either the compartment $a$ or the compartment $b$ of the cylinder 23 would be practically empty of the liquid, although a suitable actuating fluid would have taken its place.

Supposing all of the parts to be properly assembled and in proper working order, the operation might be described as follows: The reservoir 5 having been properly charged with fluid such as air or gas and it becoming desirable to actuate the wheels so as to make the vehicle deviate from a straight path, the operator might grasp the handle 26 so as to rock the controlling element having tappet arms 25—25, which rocking would depress one of the stems 18 and leave the other free. By depressing one of the stems 18 its coöperating piston 15 would be depressed carrying with it the valve 12$^b$ which would be unseated sufficiently to permit an inrush of air from the reservoir through the chamber 12 into the chamber X and out through the port 21. The continued passage of this air through one of the tubular connections or pipes 22 into the cylinder 23 through either of the ports 41—41, would cause pressure to be exerted upon the liquid with the result that said liquid would flow through one of the communicating ports 37 in one of the partitions 35 and exert pressure against one face of the piston. The rapidity with which the liquid would flow from either the chamber $a$ or $b$ through the port 37 into the central compartment would necessarily depend upon the size of either of the openings 37. It is obvious that the size of the openings 37 could be regulated to a nicety by adjusting the screws 36.

It has been said heretofore that the valves 17 were freely movable valves, therefore, it would follow that if one of the stems 18 should be depressed so as to unseat its coöperating valve 12$^b$, the other valve in a corresponding cylinder would be practically free. However, the valve 12$^b$ in the cylinder in which the free valve 17 was located would remain seated, so that the pressure from the exhausting side of the cylinder 23 could exhaust from one of the pipes 22 through the port 21, through the perforate head 14, thence through the port 16$^a$ and out through the flared portion of its piston 15, unseating the valve 17 for that purpose. It will, therefore, be seen that when pressure is admitted to one side of the piston 40 it is fully relieved on the opposite side, and attention is also directed to the fact that by the arrangement heretofore described I am enabled to provide for an efficient control of the steering mechanism with a minimum number of parts. The respective ports 41 together with their pipes 22 and the ports 21 in the cylinders 8—8 become alternately supply and exhausts. A practical advantage resulting from the novel arrangement of my invention wherein the respective cylinders 8—8 may exhaust to atmosphere is that any liability of danger from parts becoming broken will be avoided. It will be apparent that in the present form of the controller, the springs 20 normally keep the valves 12$^b$ seated. By the construction illustrated, however, I am enabled to provide against accident on account of disarrangement of the parts. For example, if one or more of the springs 20 became broken so as to permit the valve or valves 12$^b$ to become unseated and thereby accidentally admit air pressure from the source of supply through the chamber 12 and into the chamber X, said air would be permitted to exhaust through the flared portion 16 of the piston 15 by unseating the valve 17. When pressure is being applied to one side of the piston 40, the valve 17, in the cylinder 8, through which the pressure is being communicated to the cylinder 23, will be kept seated by the action of one of the arms 25 bearing upon the stem 18, said arm being assisted in maintaining the valve 17 seated through the medium of its spring 20 which will be under compression during the time that the valve 12$^b$ is unseated to admit pressure from the source of supply to the cylinder 23.

In view of the fact that the liquid is noncompressible, it will be clear that after the piston 40 has been set so as to turn the wheels to the proper angle of inclination there will be but slight liability of the angle being destroyed except when pressure is relieved by the operator, the fluid within the compartment $c, d$ being capable of tending to hold the piston 40 rigid. However, if there is any movement of the piston 40, the deflection of the wheels from the path in which it is desired to turn them may be rectified by the operator by manipulating the handle 26. It will, of course, be clear that the longer either of the valves 12$^b$ remains unseated, the more pressure will be admitted to either the compartment $a$ or $b$ and the greater will be the movement of the piston 40. For example, by momentarily depressing one of the stems 18 a slight amount of motive fluid will be permitted to pass through the controller and into the cylinder 23 through the pipes 22 causing the wheels to move on their pivots slightly, but should one of the valves 12$^b$ be unseated for a comparatively lengthy period the movement of the piston 40 will be increased to such an extent that a comparatively larger swing will be imparted to the wheels causing the vehicle to travel in a much smaller arc than it would travel if the valve was only momentarily unseated. As soon as the turn is accomplished and it becomes desirable to bring the wheels into proper alinement, the lever 26 may be returned to its intermediate position whereupon the contacting arm 25 is moved away from its tappet valve and the tension of the spring 20 will return the valve to the position shown in Fig. 4 at the same time permitting the pressure which has been exerted against the liquid to exhaust through the pipe 22 and out through the flared portion of the piston 15.

What I claim is:

1. In a vehicle, the combination with a supporting frame and sets of swinging traction members, of oppositely disposed rock shafts, operative connection between each of said rock shafts and one of said sets of traction members, and means under the control of the operator for rocking said shafts.

2. In a vehicle, the combination with a supporting frame and swinging traction members, of oppositely disposed rock shafts, operative connection between each of said rock shafts and one of said traction members, and a motor under the control of the operator and including a piston intermediate said rock shafts and having its opposite ends in operative connection with said respective shafts.

3. In a vehicle, the combination with a swinging traction member and a supporting frame including spaced frame members, of a hollow casing connecting said frame members, a rock shaft in said casing and operatively connected to said traction member, and means for rocking said shaft.

4. In a vehicle, the combination with a swinging traction member and a supporting frame including front and rear axle trees, of brackets upon said axle trees, a hollow casing supported by said brackets, a rock shaft in said casing and operatively connected with said traction member, and means for rocking said shaft.

5. A mechanism capable of use as a steering gear comprising a movable member, a slotted casing, a shaft received in the casing and connected with the member, an arm carried by the shaft and extending through the slot, a fluid actuated means connected with the arm, and means for controlling the operation of the fluid actuated means.

6. A mechanism capable of use as a steering gear, comprising a member movable in one plane, a second member movable in a plane transverse to the plane of movement of the first named member, a hooked element carried by the second named member, a connecting means secured to the hooked element and connected with the first named member, the connecting means extending transversely to both members, fluid actuated means connected with the second named member, and means for controlling the operation of the fluid actuated means.

7. A mechanism capable of use as a steering gear comprising a movable member, a cylinder divided into a plurality of series of liquid containing compartments, the compartments in each series communicating, a fluid actuated piston dividing one series from the other series, a rod to which the piston is secured, means connecting the rod and the movable member, and means for controlling the operation of the piston.

8. A mechanism capable of use as a steering gear comprising a cylinder, stationary apertured division plates and a piston located therein, the plates and piston dividing the cylinder into a plurality of isolated series of compartments, the compartments of each series being intercommunicating, means for regulating the size of the apertures, the compartments adapted to contain a liquid, one compartment in each series provided with a port for admitting a fluid motive power, a movable member, means connecting the movable member and piston, and means for controlling the admission of fluid motive power to the ports.

9. The combination in a steering mechanism, with a movable element, of a compartment cylinder adapted to contain a liquid, a piston subdividing one of the compartments, the remaining compartments provided with ports, communications between the last named compartments and the respective subdivided compartments, means for controlling the admission of fluid motive power to the cylinder, and means connecting the piston and the movable member.

10. The combination with a vehicle provided with a plurality of movable members, of means connecting the movable members in series, a non-compressible fluid operated means connected with the first named means for actuating the movable members simultaneously, and a compressible means controlling the actuation of the fluid operated means.

11. In a steering mechanism, the combination with a cylinder having oppositely located ports and a piston within the cylinder, of apertured division members located on opposite sides of the piston, the cylinder adapted to contain a liquid, and means for regulating the size of the apertures.

12. In a steering mechanism, the combination with a cylinder having ports and a piston located within the cylinder, of apertured division members located on opposite sides of the piston and with the piston subdividing the cylinder into compartments, the compartments adapted to contain a liquid, and means for admitting motive power to the ports.

13. In a mechanism adapted for use as a steering gear, the combination with a fluid actuated member, and a fluid motive power supply, of a controller comprising a valve chamber in communication with the supply, means in the chamber for normally closing the communication, means connecting the valve chamber and member, and means operable at will for controlling communication between the supply and the member.

14. The combination with a fluid actuated member, and a fluid motive power supply, of a controller comprising a chamber, separate communications between the chamber and the supply, and the chamber and the member respectively, a valve in the chamber normally adapted to close the communication between the supply and the member, and means operable at will for controlling the valve.

15. The combination with a fluid actuated member and a supply adapted to communicate therewith, of a controller interposed in the communication, the controller comprising a chamber in communication with the supply and the member, a valve in the chamber, means normally retaining the valve in position to cut off communication between the supply and the member, means operable at will for controlling the valve, and means for permitting the escape of the fluid motive power subsequently to the operation of the first named means.

16. The combination with a fluid actuated member, and a fluid motive power supply, of a controller in communication with the member and the supply, the controller comprising a perforated chamber, means in the chamber for opening or closing the communication, a hollow free piston in the chamber, adapted to contact with said means, means controlling the passage of fluid motive power through the piston, and means operable at will for controlling the first named means.

17. The combination with a fluid actuated member, and a supply of motive power, of a controller comprising a pair of chambers communicating with the supply, separate communications extending between the fluid actuated member and the respective chambers, the chambers each provided with an exhaust orifice in communication with the fluid actuated member, means controlling the last named communication, and means operable at will for controlling the communication between the supply and the member.

18. The combination with a fluid actuated member and a supply of motive power, of a controller in communication with the supply, a separate conveying member leading from the controller to opposite sides of the fluid actuated member, the controller provided with an exhaust orifice, a valve in the controller for opening or closing communication between the supply and the fluid actuated member, a perforated member carried with the valve, a hollow free piston in the controller abutting the perforated member, a tappet valve adapted to open or close the passage through the piston, and an arm operable at will for engaging the tappet to control the position of the valve, the arm also operating to cause the tappet to close the passage through the piston when the communication between the supply and the fluid actuated member is open.

19. The combination with a fluid actuated element and a supply of motive power, of a controller in communication with the supply and with the element, the controller provided with an exhaust port, a movable member in the controller constituting a valve seat, means for normally closing the communication between the supply and the element, a valve means coöperating with the movable valve seat for controlling the exhaust port, and means acting upon the valve means and movable valve seat for controlling the position of the first named means.

20. The combination with a fluid actuated element and a motive power supply, of a controller in communication with the supply and provided with an exhaust port in communication with the element, a valve structure controlling the communication between the element and the exhaust port, a second valve structure controlling the communication between the supply and the element, and means operable at will for engaging and closing the first named valve structure to open the second named valve structure.

21. The combination with a fluid actuated element and a motive power supply, of a controlling member in communication with the supply and with the element respectively, an inlet valve in the member, the member provided with an exhaust port, a hollow piston engaging the inlet valve and having a seat formed therein, a movable valve receivable in the seat and adapted to close the communication between the element and the exhaust port, and a rocking arm operable at will for engaging the movable valve to close the latter and open the inlet valve or for releasing both valves.

22. In a vehicle and in combination with the steering device thereof, a fluid motor connected to said steering device, a source of fluid supply, and a controller interposed between said motor and said supply, said controller comprising a casing having two chambers each of which is provided with an exhaust port, an inlet port in communication with said supply and a port intermediate the inlet and exhaust ports and communicating with one side of said motor, and means whereby when the inlet port of one of said chambers is open the exhaust port thereof is closed and the exhaust port of the other of said chambers is open.

23. A controller for a fluid actuated member, the controller provided with inlet and outlet ports, separate valves movable toward and from the ports, one valve being movable relative to the other valve, and separate means for moving one valve into closed position and the other valve into open position and for closing the open valve and releasing the closed valve respectively.

24. A controller for a fluid actuated member comprising a pair of chambers in separate communication with the member, each chamber provided with an inlet and outlet port, separate valves controlling the ports, a rocking means operable at will for closing one of the valves and subsequently opening the remaining valve in one or the other of the chambers, and means for closing the opened valve and returning the closed valve when the rocking means has been moved away.

25. A controller for a fluid operated member comprising a chamber provided with inlet and outlet ports, separate valves movable toward and from the ports, a single pipe extending between the chamber and the member and constituting an inlet and an exhaust passage, the outlet valve adapted to have a slight play relative to its seat, means for first closing one valve and then causing it to open the other valve, and separate means for closing the valve so opened and returning the other valve to position when released by the first named means.

26. In a controller for a fluid actuated member, a chamber having inlet and outlet ports, an inlet valve movable toward and from the port, a movable valve seat for actuating the inlet valve in one direction, an outlet valve having a movement toward and from the movable valve seat and adapted to be unseated by pressure in the fluid actuated member when the inlet valve is closed, and means for exerting pressure against the outlet valve to close the latter and move it and its seat against the inlet valve to open the latter.

27. A controller for mechanisms of the character indicated comprising a casing having two chambers each of which is provided with an inlet port, an exhaust port and a port intermediate said inlet and exhaust ports, means for introducing fluid to said inlet ports, and means whereby when the inlet port of a chamber is open its exhaust port is closed and the exhaust port of the other said chamber is open.

28. A controller for mechanisms of the character indicated comprising a casing having two chambers each of which is provided with an inlet port, an exhaust port and a port intermediate said inlet and exhaust ports, means for introducing fluid to said inlet ports, a valve for each of said inlet ports, a valve for each of said exhaust ports, operative connection between each exhaust valve and its coacting inlet valve for opening said inlet valve upon movement which holds said exhaust valve in port-closing position, and a striker for said exhaust valves adapted to leave one of them free to open when it moves the other to open the inlet valve.

29. In a controller of the character indicated, a fluid chamber having an inlet port, an exhaust port and a port intermediate said other ports, and means whereby when said inlet port is closed said exhaust port is open and when said inlet port is open said exhaust port is closed.

30. In a controller of the character indicated, a fluid chamber having an inlet port, an exhaust port and a port intermediate said other ports, a valve controlling said inlet port, a valve controlling said exhaust port, and operative connection between said valves.

31. In a controller of the character indicated, a fluid chamber having an inlet port, an exhaust port and a port intermediate said other ports, a plunger in said chamber and provided with a passage leading to said exhaust port, a valve controlling said passage and movable to impart movement to said plunger, and operative connection between said plunger and said inlet valve.

32. The combination with a vehicle and its steering device, of a steering mechanism comprising a movable element connected to said steering device, a body of non-compressible fluid upon each side of said movable element, and means for forcing a compressible fluid upon each said body of non-compressible fluid alternately and for quickly exhausting the compressible fluid on one side of the movable element when a compressible fluid is being forced upon the body of non-compressible fluid upon the opposite side of said movable element.

33. The combination with a vehicle and its steering device, of a steering mechanism comprising a casing, a movable element in said casing and connected to said steering device, a body of non-compressible fluid in said casing upon each side of said movable element, and means for introducing a compressible fluid into and exhausting the same from said casing and upon each said body of non-compressible fluid.

34. The combination with a vehicle and its steering device, of a steering mechanism comprising a housing including an intermediate chamber and side chambers at opposite ends of said intermediate chamber and communicating therewith through relatively small openings, a movable element in said intermediate chamber and operatively connected with said steering mechanism, a body of non-compressible fluid in said intermediate chamber upon each side of said movable element, and means for admitting a compressible fluid into and exhausting the same from each of the said side chambers.

In testimony whereof, I hereunto affix my signature, in the presence of two witnesses.

ALBERT F. ROCKWELL.

Witnesses:
CLARA H. VOORHEES,
JOSEPH D. BROWN.